US010410271B2

(12) United States Patent
Westphal

(10) Patent No.: US 10,410,271 B2

(45) Date of Patent: Sep. 10, 2019

(54) SYSTEM AND METHOD FOR HIGHLIGHTING DIFFERENCES IN ITEMS IN A SEARCH RESULT LISTING

(71) Applicant: W.W. GRAINGER, INC., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 739 days.

(21) Appl. No.: 14/945,072

(22) Filed: Nov. 18, 2015

(65) Prior Publication Data

US 2016/0070799 A1 Mar. 10, 2016

Related U.S. Application Data

(63) Continuation of application No. 13/075,380, filed on Mar. 30, 2011, now abandoned.

(51) Int. Cl.

*G06Q 30/00* (2012.01)
*G06Q 30/06* (2012.01)
(Continued)

(52) U.S. Cl.

CPC ....... *G06Q 30/0629* (2013.01); *G06F 16/248* (2019.01); *G06F 16/345* (2019.01);
(Continued)

(58) Field of Classification Search

CPC .... G06F 16/248; G06F 16/345; G06F 16/951; G06Q 30/02; G06Q 30/0623; G06Q 30/0629; G06Q 30/0631; G06Q 30/0641
See application file for complete search history.

(56) References Cited

U.S. PATENT DOCUMENTS 6,025,843 A * 2/2000 Sklar .................. G06F 16/2425 715/841
6,195,652 B1 2/2001 Fish
(Continued)

OTHER PUBLICATIONS

"Evaluating product search and recommender systems for E-commerce environments," by Pearl Pu, Li Chen, and Pratyush Kumar, Electronic Commerce Research (2008) 8: 1-27 (Year: 2008).*

*Primary Examiner* — Anne M Georgalas
(74) *Attorney, Agent, or Firm* — Greenberg Traurig, LLP

(57) ABSTRACT

A received search query is used to create a search result where the search result is a listing of items identified in a data repository of item information where the item information includes data indicative of parametric values for each of a plurality of items. Data indicative of parametric values within the item information of the listing of items is used to order the search result for display whereby at least one subset of items within the listing of items determined to have similar parametric values will be displayed as a group having positions within the listing of items that are proximate relative to each other. Data indicative of parametric values within the item information of the at least one subset of items is also used to discern differences in one or more parametric values between items in the at least one subset of items which discerned differences in the one or more parametric values between items in the at least one subset of items within the listing of items are caused to be highlighted.

3 Claims, 5 Drawing Sheets

(51) Int. Cl.

| | |
|---|---|
| ***G06F 16/951*** | (2019.01) |
| ***G06F 16/248*** | (2019.01) |
| ***G06Q 30/02*** | (2012.01) |
| ***G06F 16/34*** | (2019.01) |

(52) U.S. Cl.

CPC ........... *G06F 16/951* (2019.01); *G06Q 30/02* (2013.01); *G06Q 30/0623* (2013.01); *G06Q 30/0631* (2013.01); *G06Q 30/0641* (2013.01)

(56) References Cited

U.S. PATENT DOCUMENTS

| | | | | |
|---|---|---|---|---|
| 7,392,255 | B1 | 6/2008 | Sholtis et al. | |
| 8,065,202 | B1 | 11/2011 | Ballaro et al. | |
| 8,326,700 | B1 * | 12/2012 | Laufer .................. | G06Q 30/00 705/26.1 |
| 8,359,245 | B1 | 1/2013 | Ballaro et al. | |
| 2006/0036567 | A1 | 2/2006 | Tan | |
| 2007/0027840 | A1 * | 2/2007 | Cowling ........... | G06F 17/30286 |
| 2007/0088625 | A1 * | 4/2007 | Fish ...................... | G06Q 30/02 705/26.7 |
| 2007/0156652 | A1 * | 7/2007 | Horstmanshof .... | G06F 17/3056 |
| 2009/0150392 | A1 * | 6/2009 | Westphal .......... | G06F 17/30672 |

* cited by examiner

SYSTEM AND METHOD FOR HIGHLIGHTING DIFFERENCES IN ITEMS IN A SEARCH RESULT LISTING

RELATED APPLICATION INFORMATION

This application claims the benefit of and is a continuation of U.S. application Ser. No. 13/075,380, filed on Mar. 30, 2011, which application is incorporated herein by reference in its entirety.

BACKGROUND

Search results, for example obtained by supplying a search query to a search engine, are typically displayed to a consumer as a listing of items. Generally, the listing of items returned as a search result is ranked in a descending order of relevance wherein relevance is usually determined by the search engine provider, e.g., "GOOGLE," "YAHOO," etc. While each item listed in a search result typically includes a brief textual and/or image description as well as a link by which a consumer can access further, i.e., more specific, details regarding an item included within a search result listing, e.g., an item details page, it is often difficult for a consumer to quickly discern from the brief amount of information that is typically provided in a search result listing what, if any, differences may exist between the various items that are within the search results returned by the search engine.

SUMMARY OF THE INVENTION

The following generally describes a system and method for providing a search result in response to a received search query wherein items listed within the search result are provided with readily discernable item difference information. More particularly, a received search query is used to create a search result where the search result is a listing of items identified in a data repository of item information where the item information includes data indicative of parametric values for each of a plurality of items. Data indicative of parametric values within the item information of the listing of items is used to order the search result for display whereby at least one subset of items within the listing of items determined to have similar parametric values will be displayed as a group having positions within the listing of items that are proximate relative to each other. Data indicative of parametric values within the item information of the at least one subset of items is also used to discern differences in one or more parametric values between items in the at least one subset of items which discerned differences in the one or more parametric values between items in the at least one subset of items within the listing of items are caused to be highlighted. As such, it will be appreciated that the subject system and method has, among others, the advantage of allowing a consumer to readily discern differences between items using information that is obtained directly from a search result listing, i.e., without having to drill down to item detail pages, without having to invoke a comparison function, etc.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
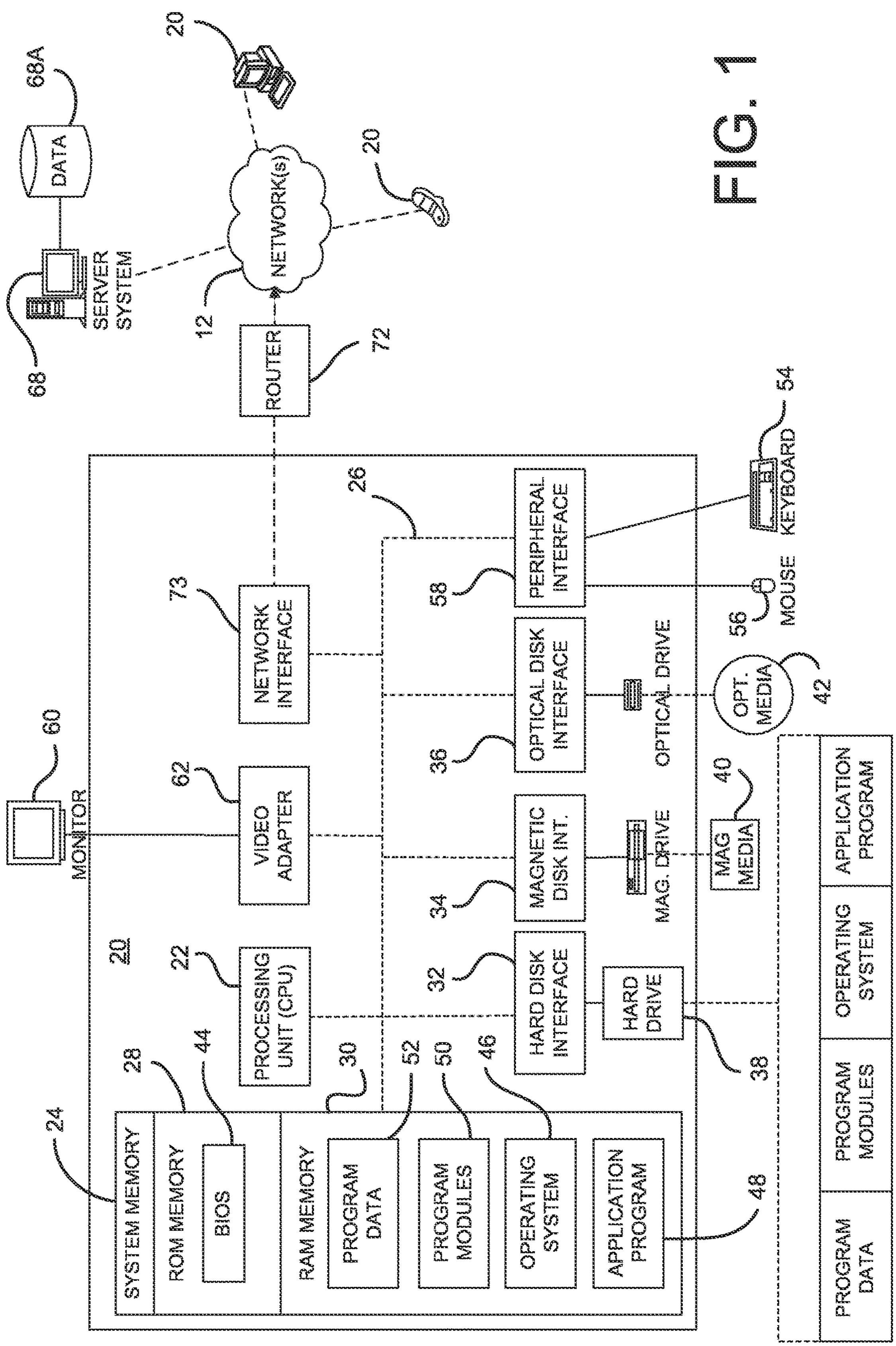
FIG. 1 is a block diagram illustrating components of an exemplary network system in which the subject method may be employed.

With reference to the figures, a system and method is hereinafter described for providing search results wherein items listed within the search result are provided with readily discernable item difference information. While not intended to be limiting, the system and method will be described in the context of a plurality of processing devices linked via a network, such as a local area network or a wide area network, as illustrated in FIG. 1. In this regard, a processing device 20, illustrated in the exemplary form of a computer system, is provided with executable instructions to, for example, provide a means for a consumer, i.e., a user, to access a remote processing device, i.e., a server system 68, via the network to, among other things, perform a search query via use of a search engine supported by the remote processing device to obtain search results. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the non-volatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nanodrives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

An end-user, e.g., a consumer, may enter commands and information into the processing device 20, e.g., a search query, through input devices such as a keyboard 54 and/or a pointing device 56. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the server system 68 having one or more associated data repositories 68A, e.g., storing a database of product information. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network. Additionally, the server system 68 may have logical connections to other third party server systems via the network 12 and, via such connections, will be associated with data repositories that are associated with such other third party server systems.

For performing tasks as needed, the server system 68 may include many or all of the elements described above relative to the processing device 20. By way of further example, the server system 68 includes executable instructions stored on a non-transient memory device for, among other things, handling search requests, providing search results, providing access to context related services, etc. Communications between the processing device 20 and the server system 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the server system 68.

To store the item information that is to be returned as a search result in response to one or more keywords, drill-down selections, or the like (i.e., "a search query") being submitted to a search engine operating on the server system 68, the one or more data repositories 68A associated with the server system 68 preferably utilize an ontology, i.e., a structural framework for organizing information. In the exemplary context of online commerce, such an ontology generally manifests itself as a product hierarchy or product "tree." As will be appreciated, when such a product hierarchy is traversed from the top (i.e., the most abstract and least specific) to the bottom (i.e., most specific), products within the product hierarchy tend to share more and more attributes or parameters in common. The subject system and method thus utilizes the information contained within the product hierarchy to create a "parametric signature" for products whereby, as part of a search engine ranking algorithm, products sharing the same (or very similar) "parametric signatures," i.e., products close to one another towards to bottom of the product hierarchy, are grouped together when information pertaining to such products are presented in a search result listing. More particularly, the "parametric signatures" can be formulated as a compound index on the text of the parameters, on numeric values which correspond to a position of a parameter in a dictionary of unique parameter names, a combination of the two, etc.

Figure 2:
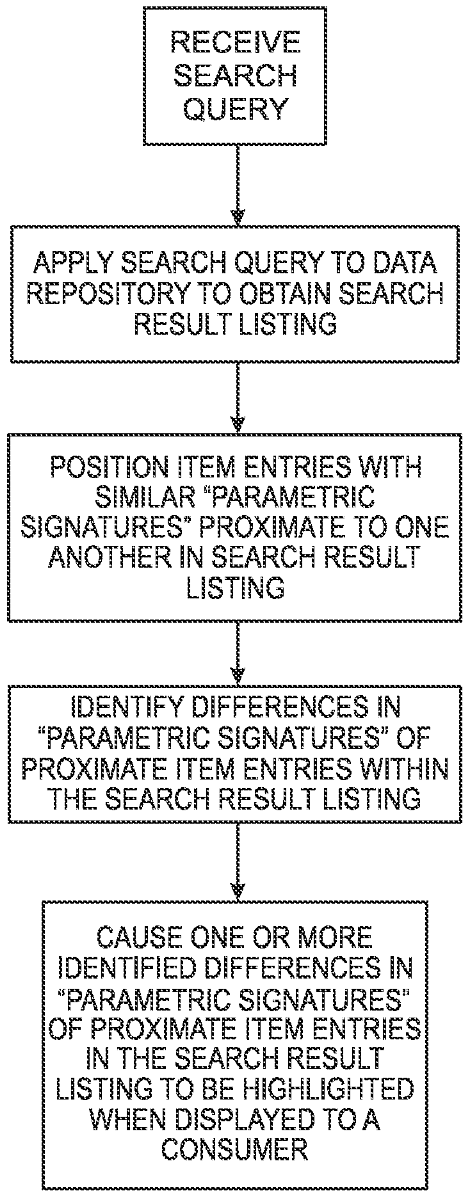
FIG. 2 is a flow chart illustrating steps of an exemplary method for providing search results wherein items listed within the search results are provided with readily discernable item difference information.

Turning now to FIGS. 2-5, FIG. 3 illustrates an exemplary search result listing 300 returned by a search engine operating on the server system 68 according to an exemplary method such as illustrated in FIG. 2 wherein items determined to share similar "parametric signatures" are grouped in proximity with respect to one another within the search results listing that is presented to the consumer in response to a search query. More particularly, in the example illustrated in FIG. 3, each item 302 listed in the search result 300 includes a brief textual and/or image description 304 as well as a link 305 by which a consumer can access further details regarding an item included within the search result listing 300, e.g., a product detail page. Such information would be extracted from the data repository 68A for inclusion in the search results listing using well known techniques.

Figure 3:
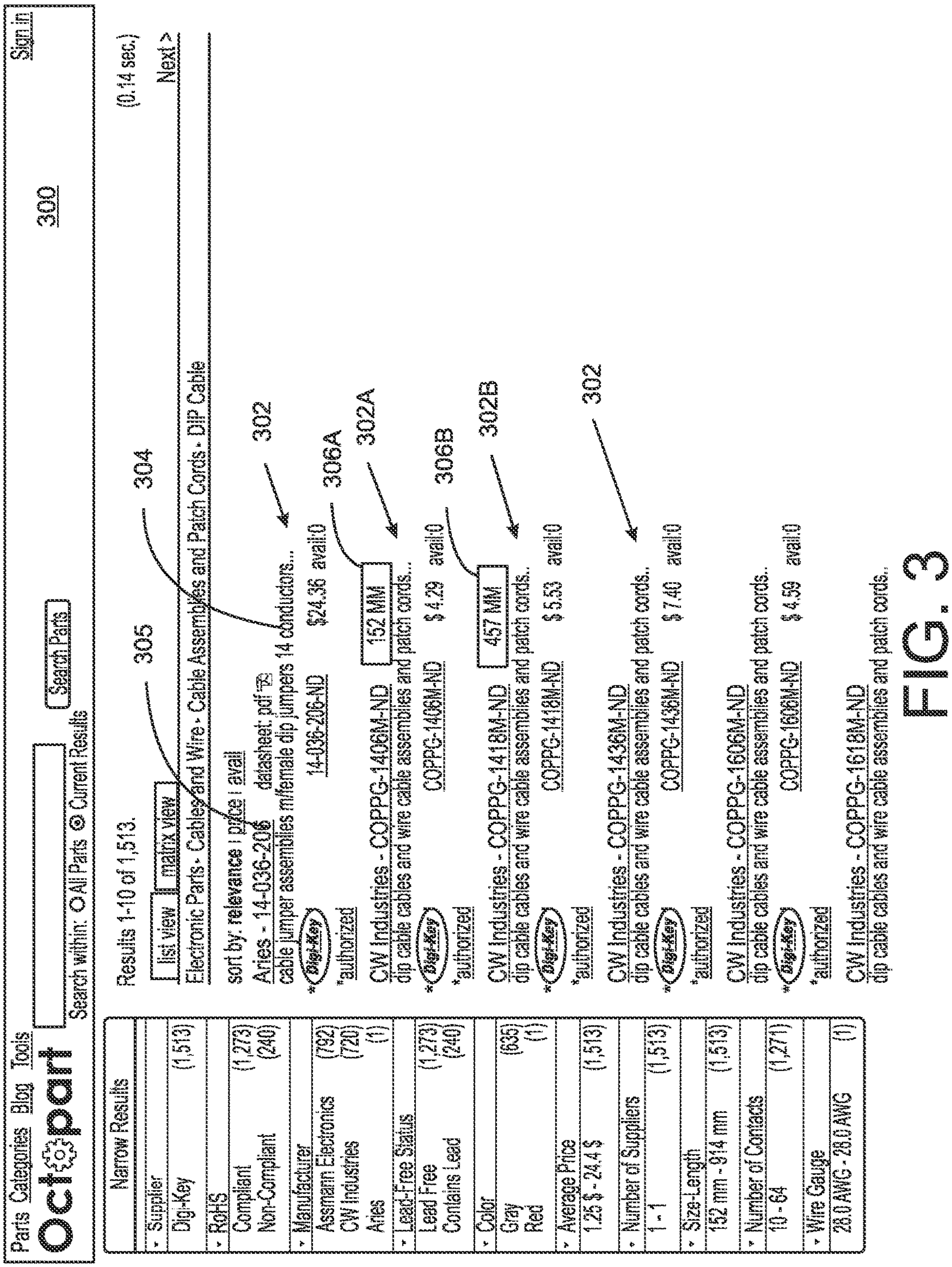
FIGS. 3-5 illustrate screen shots of exemplary search result listings returned to a consumer utilizing the method steps of FIG. 2.

As particularly shown in FIG. 3, items 302A and 302B, which are shown as being positioned in proximity/adjacent to one another within the search results listing, not only have similar "parametric signatures" but, in fact, have the same informational description, e.g., "dip cable cables and wire cable assemblies and patch cords . . . ," stored in the data repository 68A. Because presenting only this informational description to a consumer would not allow the consumer to readily discern from the search results listing if any differences exist between items 302A and 302B (e.g., while the model numbers for each matching product are different, it is not clear from the informational descriptions extracted from the data repository 68A what, if any, functional differences exist between the two products), the search engine further functions to examine the "parametric signatures" associated with items 302A and 302B to identify if any differences exist there between. To the extent any differences are determined to exist in the "parametric signatures" of two or more items within a group of items having similar "parametric signatures," i.e., items that would be grouped together by the search engine in the search results listing, such differences are further caused to be highlighted or otherwise called to the attention of the consumer within the search results listing display as described hereinafter.

Figure 4:
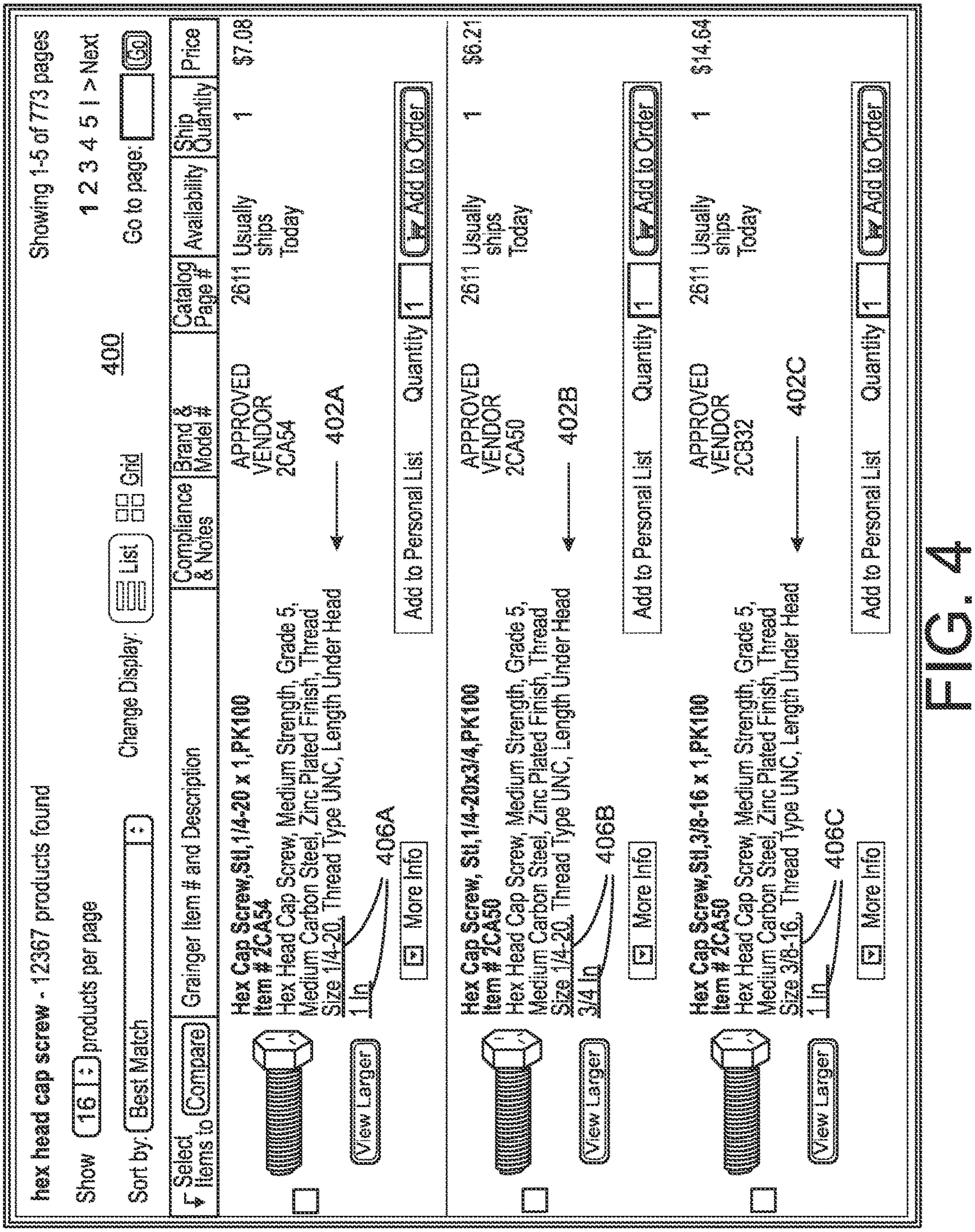

By way of specific example, having determined that the "parametric signatures" of grouped items 302A and 302B differ in at least one parametric value, i.e., the sizes are different, the search results listing display 300, e.g., as shown in FIG. 3, is further augmented by the search engine (or associated programming) to thereby present to the consumer in a highlighted fashion the differing parametric values 306A and 306B, i.e., information pertaining to the differing parametric values is caused to be added to the search result listing display. Similarly, having determined that the "parametric signatures" of grouped items 402A, 402B, and 402C differ in at least one parametric values, i.e., the length and sizes are different, the search result listing display 400, e.g., as shown in FIG. 4, is further augmented by the search engine (or associated programming) to thereby present to the consumer in a highlighted fashion the differing parametric values 406A, 406B, and 406C i.e., information pertaining to the differing parametric values is caused to be highlighted within the existing informational descriptions taken from the data repository 68A when presented in the search results listing display. To highlight the parametric differences to a user, the information pertaining to the differing parametric values can be shown with unique colors (which can be accompanied by a key wherein colors are mapped to particular product features/attributes), with unique font, with underlining, with bold, with unique backgrounds, e.g., red squares, blue circles, yellow rectangles, etc., with sound tags, with pop-up displays, with pointers, and the like without limitation. Furthermore, to limit the amount of differences to be highlighted in a displayed search results listing, only differences between item entries within a well defined group of items have similar "parametric signatures" can be considered.

Figure 5:
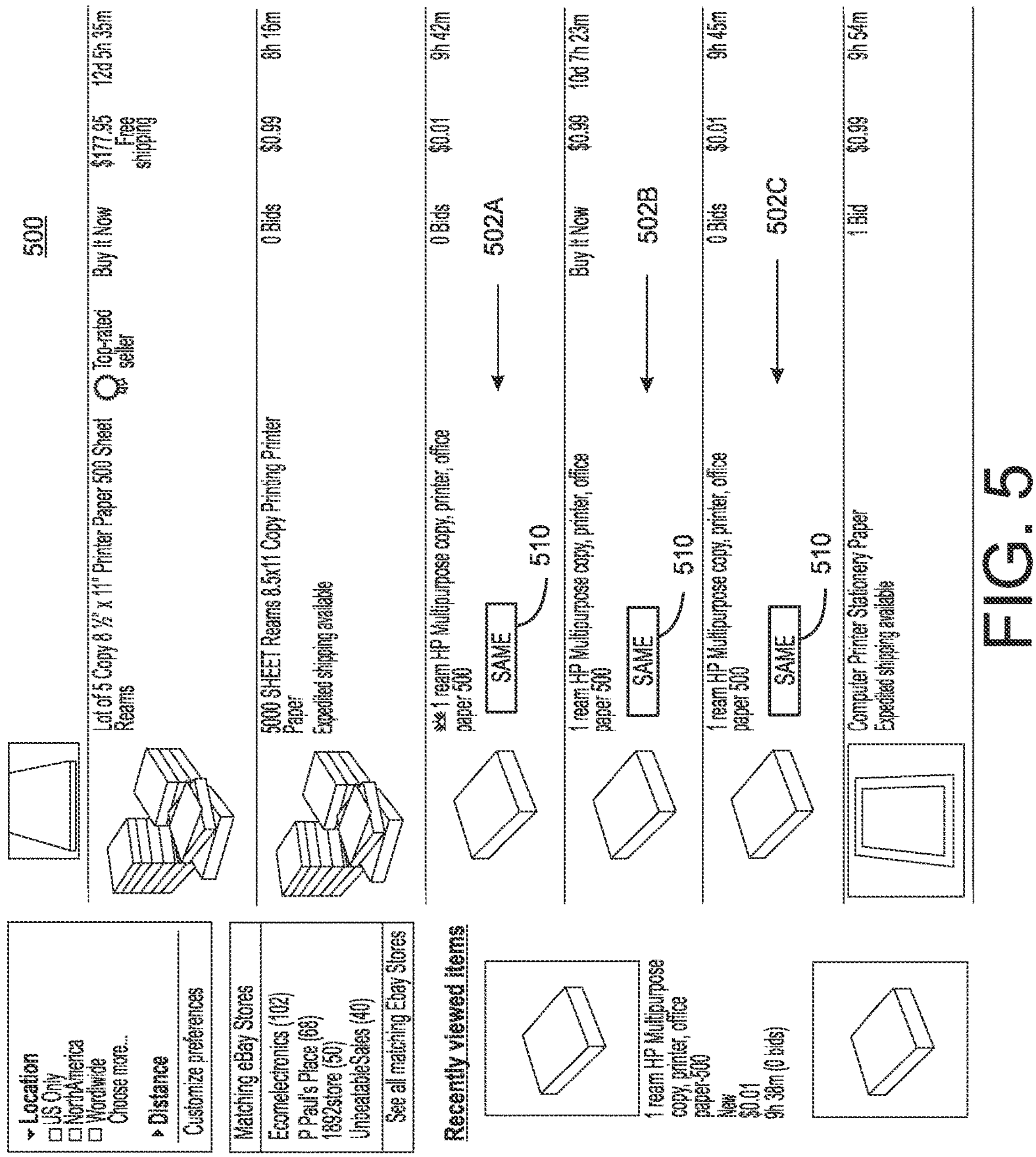

Yet further, in the instance where the system determines that the "parametric signatures" of grouped items 502A, 502B, and 502C are identical, the search result listing display 500, e.g., as shown in FIG. 5, may be further augmented by the search engine (or associated programming) to thereby present to the consumer in a highlighted fashion the fact that the items have no differing parametric values, i.e., information noting that the products are the same 510 is caused to be added to the search results listing display.

While various concepts have been described in detail, it will be appreciated by those skilled in the art that various modifications and alternatives to those concepts could be developed in light of the overall teachings of the disclosure. For example, while described in the context of a networked system, it will be appreciated that the search engine functionality can be included on the search query receiving computer itself. Similarly, while described in the context of search results presented in a listing, the method may be employed where search results are presented in another known manner, such as in a gallery mode. Yet further, while described in the context of products, it will be appreciated that differences in other items, such as photographs, videos, or the like, can also be highlighted, such as resolution, language, play time, etc. Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A search engine, comprising:

a processing device;

a data repository of item information wherein the item information includes a data that is indicative of parametric values for each of a plurality of items; and a computer readable media, embodied in a non-transient, physical memory device, having stored thereon instructions executable by the processing device for providing a search result in response to a received search query wherein the instructions cause the processing device to perform steps comprising:

using the received search query to create the search result wherein the created search result comprises a listing of a plurality of items selected from the data repository and wherein the search result includes the data that is indicative of parametric values for each of the plurality of items within the listing;

using the data that is indicative of parametric values for each of the plurality of items within the listing to organize the search result for display on a search requesting computing device so that a plurality of items within the listing having similar parametric values are displayed in proximity with respect to one another within the listing to thereby form within the listing a plurality of subsets of items;

using the data that is indicative of parametric values for each of the plurality of items within the listing that are within each of the plurality of subsets of items to discern differences in one or more numerical parametric values between the plurality of items within the listing that are within each of the plurality of subsets of items; and causing at least a portion of the item information associated with each of the plurality of items in the listing to be displayed on the search requesting computing device as a search results graphical user interface with only those specific numerical parametric values included within the item information for each of the plurality of items in the listing included in the search results graphical user interface that were discerned to have differences being provided with highlighting.

2. The search engine as recited in claim 1, wherein the instructions cause the processing device to create a parametric signature for each item of the plurality of items that is within the listing and to use the created parametric signature for each item of the plurality of items that is within the listing to determine the plurality of subsets of items within the listing.

3. The computer-readable media as recited in claim 1, wherein the instructions cause the processing device to provide the search result for display using a graphical user interface gallery mode.

* * * * *